United States Patent [19]

Canevari et al.

[11] Patent Number: 5,618,468
[45] Date of Patent: Apr. 8, 1997

[54] CHEMICAL DISPERSANT FOR OIL SPILLS

[75] Inventors: Gerard P. Canevari, Cranford; Robert J. Fiocco, Summit, both of N.J.; Kenneth W. Becker, Houston, Tex.; Richard R. Lessard, Morristown, N.J.

[73] Assignee: Exxon Research and Engineering Company, Florham Park, N.J.

[21] Appl. No.: 263,974

[22] Filed: Jun. 22, 1994

Related U.S. Application Data

[63] Continuation-in-part of Ser. No. 990,963, Dec. 15, 1992, abandoned.

[51] Int. Cl.⁶ .............................. B01F 17/10; E02B 15/04
[52] U.S. Cl. .......................... 252/354; 252/312; 210/749; 210/693; 210/925
[58] Field of Search ................................ 252/312, 354; 210/749, 925, 693

[56] References Cited

U.S. PATENT DOCUMENTS

| | | | |
|---|---|---|---|
| 3,793,218 | 2/1974 | Canevari | 252/312 |
| 3,959,134 | 5/1976 | Canevari | 210/59 |
| 3,998,733 | 12/1976 | Blanchard et al. | 210/59 |
| 4,110,213 | 8/1978 | Tennant et al. | 252/312 |
| 4,469,603 | 9/1984 | Lepain et al. | 210/749 |
| 4,502,962 | 3/1985 | Becker et al. | 210/749 |
| 4,560,482 | 12/1985 | Canevari | 210/749 |
| 4,597,893 | 7/1986 | Byford et al. | 252/354 |
| 4,764,285 | 8/1988 | Robbins et al. | 210/749 |
| 4,830,759 | 5/1989 | Charlier | 210/749 |
| 5,051,192 | 9/1991 | Charlier | 210/749 |
| 5,430,097 | 7/1995 | Petroff et al. | 524/755 |
| 5,512,211 | 4/1996 | McSwigan et al. | 252/353 |

FOREIGN PATENT DOCUMENTS

| | | |
|---|---|---|
| 0155208 | 9/1985 | European Pat. Off. . |
| 2108951 | 5/1983 | United Kingdom . |

OTHER PUBLICATIONS

Treiner et al., "Oil–In–Water Emulsion Investigation in the System Oil/Brij 35/Phenoxy, 2–Ethanol/Sea Water: Comparison of Partitioning and Droplet Data", *Journal of Colloid and Interface Science*, vol. 129, No. 1, Apr., 1989, pp. 201–207.

Proceedings of The Eighth Annual Arctic Marine Oilspill Program Technical Seminar, Jun. 18–20, 1985, pp. 245–259.

*Primary Examiner*—Richard D. Lovering
*Assistant Examiner*—Daniel S. Metzmaier
*Attorney, Agent, or Firm*—James H. Takemoto

[57] ABSTRACT

An improved dispersant formulation for dispersing oil which contains a mixture of a sorbitan monoester of an aliphatic monocarboxylic acid, a polyoxyethylene adduct of a sorbitan monoester of an aliphatic monocarboxylic acid, a water-dispersible salt of a dialkyl sulfosuccinate, a polyoxyethylene adduct of a sorbitan triester or a sorbitol hexaester of an aliphatic monocarboxylic acid and a glycol ether which has a maximum water solubility of 25 ml/100 ml as solvent.

9 Claims, No Drawings

CHEMICAL DISPERSANT FOR OIL SPILLS

This patent application is a continuation-in-part of U.S. Ser. No. 990,963 filed Dec. 15, 1992, now abandoned.

BACKGROUND OF THE INVENTION

1. Field of the Invention

This invention relates to an oil dispersant formulation and a process for dispersing spilled oil on water. More particularly, a formulation of chemical surfactants and solvent results in a low toxicity dispersant which is effective at dispersing oil at low concentrations under a wide range of weather conditions.

2. Description of the Related Art

One of the technologies used for oil spill response involves the use of chemical dispersants. The application of chemical dispersants is dependent on several factors: (1) weather conditions, (2) nature of the oil spilled, (3) area to be covered and (4) adequacy of equipment and supplies. Although it is highly desirable, it has not been possible to provide a single chemical dispersant formulation which will treat all oils under all conditions. For example, it is much more difficult to disperse a high-boiling viscous oil such as bunker oil as compared to a light crude oil. Furthermore crude oils and oil products vary widely in their properties including ability to be dispersed.

A desirable property for chemical dispersants used to treat oil spills is that the surfactant formulation of the dispersant results in very low oil-water interfacial tension such that the oil is effectively dispersed as fine oil droplets in water without coalescing even at low dispersant to oil ratios. Also, the dispersant formulation should be of minimal toxicity so that it does not add to the environmental damage caused by the oil spill.

Various dispersant formulations have been advanced for treating oil spills. U.S. Pat. No. 3,793,218 discloses a dispersant formulation for dispersing oil slicks. U.S. Pat. No. 4,560,482 relates to a dispersant composition for treating oils having viscosities of from 1000 to 10,000 cp in water.

SUMMARY OF THE INVENTION

The present invention provides an improved dispersant formulation which is effective on highly viscous hydrocarbons and an improved process for dispersing an oil layer on water.

The improved dispersant formulation comprises:

(a) a sorbitan monoester of a $C_{10}$–$C_{20}$ aliphatic monocarboxylic acid, (b) a polyoxyethylene adduct of a sorbitan monoester of a $C_{10}$–$C_{20}$ aliphatic monocarboxylic acid, said adduct having from 6 to 30 polyoxyethylene per mole of ester, (c) a water-dispersible salt of a dialkyl sulfosuccinate wherein the alkyl group is a branched chain radical containing 8 to 13 carbon atoms, (d) a polyoxyethylene adduct of a sorbitan triester of a $C_{10}$–$C_{20}$ aliphatic monocarboxylic acid having from 6 to 30 polyoxyethylene units per mole of triester or a polyoxyethylene adduct of a sorbitol hexaester of a $C_{10}$–$C_{20}$ aliphatic monocarboxylic acid, said having from 6 to 30 polyoxyethylene units per mole of hexaester, and (e) a propylene or ethylene glycol ether solvent having a maximum solubility in water of about 25 ml per 100 ml water, wherein the dispersant has a HLB of from about 10 to about 11. The improved process for dispersing an oil layer on water comprises contacting the oil layer on the water surface with the dispersant formulation described above.

DESCRIPTION OF THE PREFERRED EMBODIMENTS

In the sorbitan esters of $C_{10}$–$C_{20}$ aliphatic monocarboxylic acids (component (a)), the aliphatic radical is straight or branched chain and saturated or unsaturated. Preferred aliphatic monocarboxylic acid moieties are $C_{12}$–$C_{18}$ straight chain saturated or monoethyleneically unsaturated. Sorbitan esters are prepared by dehydrating sorbitol followed by reaction with aliphatic monocarboxylic acid, and are available commercially from ICI under the trade name Atsurf®.

Polyoxyethylene adducts of sorbitan monoesters of $C_{10}$–$C_{20}$ aliphatic monocarboxylic acids (component (b)) have from 6 to 30, preferably 15 to 22, polyoxyethylene units per mole of ester. Such polyoxyethylene adducts are prepared by reacting the sorbitan esters of aliphatic monocarboxylic acids described above with 1,2-ethylene oxide. These polyoxyethylene adducts are available commercially from ICI Inc. under the trade name Atsurf®.

The water-dispersible salt of a dialkyl sulfosuccinate wherein the alkyl group is a $C_8$–$C_{13}$ branched chain radical (component (c)) is an anionic surfactant. A preferred salt is sodium dioctyl sulfosuccinate commercially available from Mona Industries, Inc. under the trade name Monowet®.

Polyoxyethylene adducts of sorbitan triesters or sorbitol hexaesters of $C_{10}$–$C_{20}$ aliphatic monocarboxylic acids (component (d)) contain from 6 to 30, preferably 15 to 22 polyoxyethylene units per mole of triester or hexaester. The sorbitol adduct is prepared by reacting ethylene oxide with sorbitol followed by esterification and are commercially available from ICI, Inc. under the trade name Atlox®.

The propylene or ethylene glycol ethers used as solvents in the present invention (component (e)) have a maximum solubility in water of 25 ml per 100 ml water at 25° C., preferably 10 ml per 100 ml water. Preferred solvents are dipropylene glycol n-butyl ether, propylene glycol n-butyl ether, propylene glycol phenyl ether and ethylene glycol phenyl ether, more preferably dipropylene glycol n-butyl ether and dipropylene glycol n-butyl ether, especially dipropylene glycol n-butyl ether. Glycol ethers are available commercially from Dow Chemical Co. under the trade name Dowanol®. Propylene and ethylene glycol mono ethers possess favorable lipophilic properties for use in oil dispersant formulations and are also of low toxicity.

The hydrophilic-lipophilic balance (HLB) of the improved oil dispersant formulations according to this invention ranges from about 10 to about 11. The HLB numbers on a scale of 1 to 20 represent the extent to which a given surfactant or surfactant combination behaves as water-soluble vs oil-soluble with lower numbers representing more lipophilic properties whereas higher numbers represent more hydrophilic properties. The HLB may be controlled by adjusting the concentrations of components (a) through (d) in the subject improved dispersant formulations. The concentration ranges for components (a) through (e) are as follows: (a) 1–9 vol. %; (b) 4–17 vol. %; (c) 10–34 vol. %; (d) 5–25 vol. %; and (e) 80–15 vol. %, based on dispersant formulation.

By controlling the HLB of the surfactants and the solubility properties of the solvent(s), the dispersant formulation (surfactants plus solvents) can be preferentially distributed into the oil phase thus minimizing the loss of surfactants and solvents to the aqueous phase. If the solvent is too soluble in water, the dispersant formulation tends to diffuse too rapidly into the aqueous phase thus reducing the amount of surfactant and solvent available in the spilled oil phase for dispersion. The glycol ether solvents may be combined with a hydrocarbon, preferably an isoparaffinic hydrocarbon solvent if additional viscosity control is desired. For example, such solvents are available from Exxon Company, USA under the trade name Isopar®. The total amount of solvent is from 15 to 80 vol. %, preferably 30 to 60 vol. % based on the formulation. If a solvent mixture is desired, the ratio of glycol ether to hydrocarbon in the solvent mixture ranges from 10:90 to 90:10.

The present dispersant formulations containing propylene or ethylene glycol ethers have the advantage of dispersing highly viscous hydrocarbons, i.e., hydrocarbons having a viscosity greater than 10,000 cp at 15° C. Such viscous hydrocarbons such as heavy crudes, weathered crudes and bunker oil are difficult to disperse because of the cohesiveness of the oil which resists the spreading and breakup of the oil as well as the penetration mixing of the dispersant formulation. In addition these formulations have low environmental impacts and can be sprayed over wide temperature ranges. Viscosity properties are favorable to aerial spraying over a wide temperature range, and evaporation losses are minimal which means that nearly all the solvent will reach the oil slick to aid surfactant penetration of the oil. It is preferred that the viscosities for the dispersant formulations be greater than about 60 cp at 68° F. Oil slick dispersal can be achieved by spraying the dispersant formulation directly on the slick through one or more spray nozzles. Dispersal action can be achieved under normal water motion or in the presence of wave action.

An important property of a dispersant formulation for use on oils spills is the ability to disperse the maximum amount of oil per unit of dispersant. The ability to effectively disperse oil at low dispersant to oil ratios (DOR) provides both economic and environmental benefit. By lowering the amount of dispersant per unit of oil, the total organic carbon load to the environment is lowered. The present formulations are effective at low dispersant to oil ratios.

The improved dispersant formulations are further illustrated by the following examples, which include a preferred embodiment of the invention.

EXAMPLE 1

Dispersant Effectiveness

This example is directed to dispersant effectiveness on various crude oil samples and No. 6 fuel oil. A dispersant formulation B was prepared by mixing 6.4 vol.% of sorbitan monooleate, 11.7 vol.% ethoxylated (20) sorbitan monooleate, 25.0 vol.% sodium dioctyl sulfosuccinate, 18.1 vol.% of ethoxylated (20) sorbitan trioleate and 38.8 vol.% of dipropylene glycol n-butyl ether as solvent. Dispersant formulation A is the same as formulation B except that A contains ethylene glycol n-butyl ether as solvent. Ethylene glycol n-butyl ether is a solvent employed in a commercially available dispersant formulation.

The IFP dilution test is a well-known laboratory procedure to measure dispersant effectiveness. The physical apparatus for the test involves a cylindrical glass container for holding a test solution and an oscillating hoop that fits inside the container. The glass container has two ports: (1) an inlet port located just below the experimental water level and (2) an outlet port that is located near the bottom of the vessel and contains an overflow arm extending upward to determine the depth of the test solution in the container. Clean seawater is introduced by a peristaltic pump into the glass container through the inlet port. Overflow water (containing oil droplets) leaves the container through the exit port and is collected in a flask. The oscillating hoop is suspended 20–35 mm beneath the water's surface and moves up and down with a 15 mm vertical path by an electromagnet controlled by an electronic timer. The frequency of the oscillation can be varied in the range of 6.66–20 cycles/minute. For tests designed to evaluate dispersant effectiveness, the following experimental protocol is followed: the glass container is filled with seawater, a specified amount of oil is poured onto the water surface inside a 10 cm diameter vertical ring, dispersant is added onto the surface of the oil, the oscillating hoop is started, and water flow through the peristaltic pump is started at a specified flow rate (e.g., to produce a dilution or turnover rate of 0.5/hour). Outflow water is collected for specified periods of time (e.g., 0–30 minutes, 30–60 minutes, and 60–120 minutes) and analyzed for oil content. Oil content in the collected samples follows the equation (1):

$$x = x_o e^{-Dt} \qquad (1)$$

where $x$=oil concentration at time t, $x_o$=initial dispersed oil concentration in the experimental beaker, and $D$=dilution rate.

The percentage of washed-out oil (P) at time t is:

$$P = 100(1 - x/x_o) = 100(1 - e^{-Dt}) \qquad (2)$$

Dispersion effectiveness can be determined from the equation:

$$E = 100[(P_d - P_c)/P_c] \qquad (3)$$

where $E$=dispersant effectiveness (%), $P^d$=percentage of washed-out oil at time t in solution with dispersant d, and $P_c$=percentage of washed-out oil at time t in control solution without dispersant.

The results are shown in Table 1.

TABLE 1

|  | CRUDE OIL SAMPLE* |  | DISPERSANT EFFECTIVENESS (%) | |
|---|---|---|---|---|
|  |  |  | DISPERSANT A | DISPERSANT B |
| STATFJORD | 200+*** |  | 54 | 54 |
| STATFJORD | 200+ | (DOR 1:50) | 38 | 61 |
| STATFJORD | 200+ | (DOR 1:100) | 14 | 32 |
| BALDER | 200+ |  | 70 | 82 |
| BALDER | 200+ | (DOR 1:50) | 45 | 66 |
| BALDER | 200+ | (DOR 1:100) | 27 | 44 |
| #6 FUEL OIL |  | (13,800 CP) | <1 | 39 |
| BCF | 250+ | (20,500 CP) | 15 | 59 |
| OSEBERG | 200+/50% W/O** |  | 71 | 75 |
| BALDER | 200+/50% W/O |  | 54 | 63 |

*DOR IS 1:25 UNLESS NOTED; ALL DIRECT ADDITION; TEMPERATURE 13° C.; SEA WATER
**W/O = WATER IN OIL EMULSION CONTAINING 50% SEAWATER.
***200+ IS THAT FRACTION OF OIL BOILING ABOVE 200° C.

In comparing dispersant A with dispersant B which is the improved formulation according to this invention, it can be seen that at a given DOR, absolute effectiveness can vary widely depending on the oil sample. However, at higher DOR ratios, dispersant B is generally more effective demonstrating superior dispersal at lower surfactant concentrations. Moreover, highly viscous samples such as #6 fuel oil and BCF show marked improvement by dispersant B in comparison to dispersant A. This demonstrates the favorable properties of the present formulation containing a propylene glycol ether over a comparable formulation containing an ethylene glycol ether.

EXAMPLE 2

Wave Basin Tests of Dispersant Effectiveness

This example demonstrates that the dispersant formulation of this invention can be effectively applied either neat or in a water diluted form.

The wave basin is considered to be a realistic simulation of sea conditions and comprises a concrete pool which varies in depth from 3.3 to 1.85 m. The shallow end contains a pebble beach to absorb wave energy. The wave generator is situated at the deep end of the pool and consists of four hydraulically driven wave boards spanning the pool width. The hydraulic system can be controlled to generate the desired wave pattern. A closed containment boom (approximately rectangular in shape) is located within the pool. The boom is held in place by guy ropes. A small submerged stanchion is located inside the boom to create a small active "breaking wave" zone. A second smaller closed containment boom of similar shape is located within the first containment boom. Oil was placed in the inner containment boom and dispersant formulation B was applied to the oil by spray boom or hand spray. Wave action was initiated and the inner boom opened after 10 minutes. After two hours the area within the outer boom was skimmed to recover oil. The results are shown in Table 2.

TABLE 2

| TEST NO. (1) | DISPERSANT-B CONC. | APPLICATION METHOD | NOMINAL TREAT (DOR) (2) | UNRETAINED OIL (3) | INTERFACIAL TENSION (DYNES/CM) | |
|---|---|---|---|---|---|---|
|  |  |  |  |  | START | END |
| 1 | Blank | None | — | 39% | 15 | 10 |
| 9 | Blank | None | — | 41% | 11 | 6 |
| 10 | Neat | Spray Boom | 1:20 | 93% (4) | 13 | <1 |
| 11 | 10% (5) | Hand Spray | 1:20 | 99% | 13 | <1 |
| 13 | Neat | Hand Spray | 1:40 | 94% | 13 | <1 |

NOTES:
(1) 40 Liters So. La. Sunset Pipeline Crude (37° API) applied in inner boom (6 m × 10 m). Outer boom 10 m × 14 m. 17 cm waves with artificial reef breaking wave. Water temperature 18–20° C.; Salinity 31 ppt.
(2) Dispersant applied to entire inner boom area, except Test 13 applied to oil area only.
(3) Inner boom opened 10 minutes after waves started. Oil recovered within outer boom after 2 hours by disc skimmer. Estimate approximately 17% oil evaporated during test.
(4) Unfavorable wind conditions prevented a significant amount of oil from reaching the active "breaking wave" zone. After 1 hour, oil in dead zone was gently pushed to active zone.
(5) Dispersant mixed with salt water to 10% concentration prior to application.

These results show that from 93% to 99% of the test crude oil was eliminated from the boomed test area after two hours demonstrating effective dispersal under wave conditions. The reduced interfacial tension of the remaining oil on the water within the boom shows that the treatment is more than adequate and that this oil would also be easily dispersed if suitably subjected to the wave action.

EXAMPLE 3

The solubility properties of commercially available glycol ethers are shown in Table 3.

| Chemical Name | Solubility in Water (ml/100 ml) |
|---|---|
| Propylene Glycol Methyl Ether * | ∞ |
| Dipropylene Glycol Methyl Ether | ∞ |
| Tripropylene Glycol Methyl Ether | ∞ |
| Propylene Glycol n-Butyl Ether | 7.3 |
| Dipropylene Glycol n-Butyl Ether | 5.5 |
| Propylene Glycol Methyl Ether Acetate | 20.5 |
| Dipropylene Glycol Methyl Ether Acetate | 19.4 |
| Propylene Glycol Phenyl Ether | 1.1 |
| Ethylene Glycol n-Butyl Ether | ∞ |
| Diethylene Glycol n-Butyl Ether | ∞ |
| Diethylene Glycol Methyl Ether | ∞ |
| Ethylene Glycol Phenyl Ether | 2.3 |

* Commercially available from Dow Chemical Company under the trade name Dowanol ®

As shown in Table 3, many of the commercially available glycol ethers are totally miscible with water based on their solubility properties. When such totally miscible glycol ethers are used in dispersant formulations as solvents, the solvent rapidly diffuses into the aqueous phase when applied to an oil spill thus reducing the effectiveness of distributing the surfactants throughout the oil phase.

Some water solubility is desirable to optimize stability of dispersant formulation in storage and for certain applications where dilution in aqueous medium is desirable, for example, spraying from a pressurized water delivery system. If additional viscosity control is desired, the glycol ether solvent may be mixed with a hydrocarbon solvent. Such a mixture also has the added advantage of increasing the solubility of the surfactants in the oil phase.

What is claimed is:

1. An improved dispersant formulation effective on highly viscous hydrocarbons which comprises:

(a) a sorbitan monoester of a $C_{10}$–$C_{20}$ aliphatic monocarboxylic acid, (b) a polyoxyethylene adduct of a sorbitan monoester of a $C_{10}$–$C_{20}$ aliphatic monocarboxylic acid, said adduct having from 6 to 30 ethylene oxide units per mole of ester, (c) a water-dispersible salt of a dialkyl sulfosuccinate wherein the alkyl group is a branched chain radical containing 8 to 13 carbon atoms, (d) a polyoxyethylene adduct of a sorbitan triester of a $C_{10}$–$C_{20}$ aliphatic monocarboxylic acid having from 6 to 30 ethylene oxide units per mole of triester or a polyoxyethylene adduct of a sorbitol hexaester of a $C_{10}$–$C_{20}$ aliphatic monocarboxylic acid having from 6 to 30 ethylene oxide units per mole of hexaester, and (e) a propylene glycol ether solvent, said solvent being dipropylene glycol n-butyl ether wherein the dispersant has a HLB of from about 10 to about 11.

2. The formulation of claim 1 wherein the amounts of components (a) to (e) are: (a) 1–9 vol. %, (b) 4–17 vol. %, (c) 10–34 vol. %, (d) 5–25 vol. % and (e) 80–15 vol. %.

3. The formulation of claim 1 wherein component (d) is a polyoxyethylene adduct of a sorbitan triester of a $C_{10}$–$C_{20}$ aliphatic monocarboxylic acid.

4. The formulation of claim 1 wherein the solvent is a mixture of glycol ether and hydrocarbon.

5. The formulation of claim 4 wherein the hydrocarbon solvent is an isoparaffinic hydrocarbon.

6. The formulation of claim 1 wherein the viscosity of the dispersant formulation is greater than about 60 cp at 68° F.

7. The formulation of claim 1 wherein component (d) is the polyoxyethylene adduct of a sorbitol hexaester of a $C_{10}$–$C_{20}$ aliphatic monocarboxylic acid.

8. A method for dispersing an oil layer on water which comprises contacting the layer with the dispersant formulation of claim 1.

9. The method of claim 8 wherein the dispersant formulation is applied to the oil layer by aerial spraying.

* * * * *